US007602757B2

(12) United States Patent
Jeong et al.

(10) Patent No.: US 7,602,757 B2
(45) Date of Patent: Oct. 13, 2009

(54) SYSTEM AND METHOD FOR CHANNEL SCANNING IN WIRELESS NETWORKS

(75) Inventors: Moo Ryong Jeong, San Jose, CA (US); Xia Gao, Sunnyvale, CA (US); Fujio Watanabe, Sunnyvale, CA (US); Gang Wu, Cupertino, CA (US)

(73) Assignee: NTT DOCOMO, Inc., Tokyo (JP)

( * ) Notice: Subject to any disclaimer, the term of this patent is extended or adjusted under 35 U.S.C. 154(b) by 556 days.

(21) Appl. No.: 11/220,837

(22) Filed: Sep. 6, 2005

(65) Prior Publication Data

US 2006/0023686 A1 Feb. 2, 2006

Related U.S. Application Data

(62) Division of application No. 10/733,927, filed on Dec. 10, 2003.

(60) Provisional application No. 60/438,964, filed on Jan. 9, 2003, provisional application No. 60/492,689, filed on Aug. 5, 2003.

(51) Int. Cl.
H04W 4/00 (2009.01)
(52) U.S. Cl. .................... 370/338; 455/434
(58) Field of Classification Search ............ None
See application file for complete search history.

(56) References Cited

U.S. PATENT DOCUMENTS

| 5,086,507 | A * | 2/1992 | Mela ............ 455/509 |
| 6,442,130 | B1 * | 8/2002 | Jones et al. ......... 370/208 |
| 6,587,457 | B1 | 7/2003 | Mikkonen |
| 6,950,653 | B2 * | 9/2005 | Reid ............ 455/423 |
| 7,006,465 | B2 | 2/2006 | Toshimitsu et al. |
| 7,230,937 | B2 * | 6/2007 | Chi et al. ........ 370/329 |
| 2002/0009066 | A1 | 1/2002 | Shimizu et al. |
| 2002/0098846 | A1 | 7/2002 | Kashiwagi et al. |
| 2003/0067921 | A1 | 4/2003 | Sivalingham |
| 2003/0236860 | A1 | 12/2003 | Yegin |
| 2004/0029584 | A1 | 2/2004 | Le et al. |

(Continued)

FOREIGN PATENT DOCUMENTS

WO 2004/036823 4/2001

(Continued)

OTHER PUBLICATIONS

Ecclesine, Peter, "Draft of 5 Criteria For 4.9GHz-5GHz Operation in Japan," IEEE P802.11, Wireless LANs, Sep. 2002, 5pp.

(Continued)

Primary Examiner—Phirin Sam
(74) Attorney, Agent, or Firm—Haynes and Boone, LLp

(57) ABSTRACT

Channel scanning for wireless networks, such as Wireless Local Area Networks (WLANs), generally provides a wireless station with the information on the available WLAN resources, such as the frequency band and the maximum transmission power. The present invention provides safe and fast domain-aware channel scanning, enabling a wireless station to comply with applicable local regulations, in spite of the possibility of domain changes, with short channel-scanning time. Fast channel scanning is accomplished by active channel scanning if valid domain information is available and there is no possibility of domain change. Also, domain-independent channels, if any, are first scanned using active scan to get domain information faster.

8 Claims, 5 Drawing Sheets

U.S. PATENT DOCUMENTS

| | | | |
|---|---|---|---|
| 2004/0039817 A1 | 2/2004 | Lee et al. | |
| 2004/0127240 A1 | 7/2004 | Li | |
| 2004/0179549 A1 | 9/2004 | Ophir et al. | |
| 2004/0199616 A1* | 10/2004 | Karhu | 709/221 |
| 2004/0202141 A1* | 10/2004 | Sinivaara et al. | 370/338 |
| 2004/0203698 A1 | 10/2004 | Comp | |
| 2004/0203824 A1* | 10/2004 | Mock et al. | 455/452.1 |
| 2004/0213181 A1 | 10/2004 | Grech et al. | |
| 2004/0214539 A1 | 10/2004 | Rajamani et al. | |
| 2005/0147062 A1 | 7/2005 | Khouaja et al. | |
| 2005/0180345 A1 | 8/2005 | Meier | |

FOREIGN PATENT DOCUMENTS

| | | |
|---|---|---|
| WO | 01/97549 | 12/2001 |

OTHER PUBLICATIONS

Ecclesine, Peter, "Draft of 5 Criteria For 4.9GHz-5GHz Operation in Japan," IEEE P802.11, Wireless LANs, Sep. 2002, 4pp.

"Part 11: Wireless LAN Medium Access Control (MAC) and Physical Layer (PHY) Specifications, Amendment 3: Specification for Operation in Additional Regulatory Domains," IEEE Std 802-11d-2001, published Jul. 13, 2001, pp. 1-26.

* cited by examiner

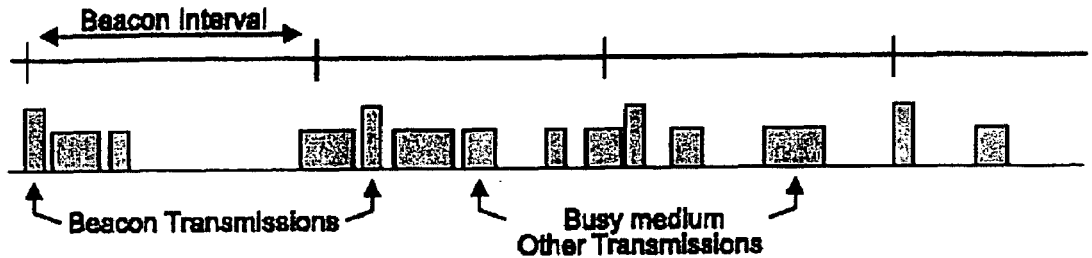
-- Prior Art --
FIG. 1
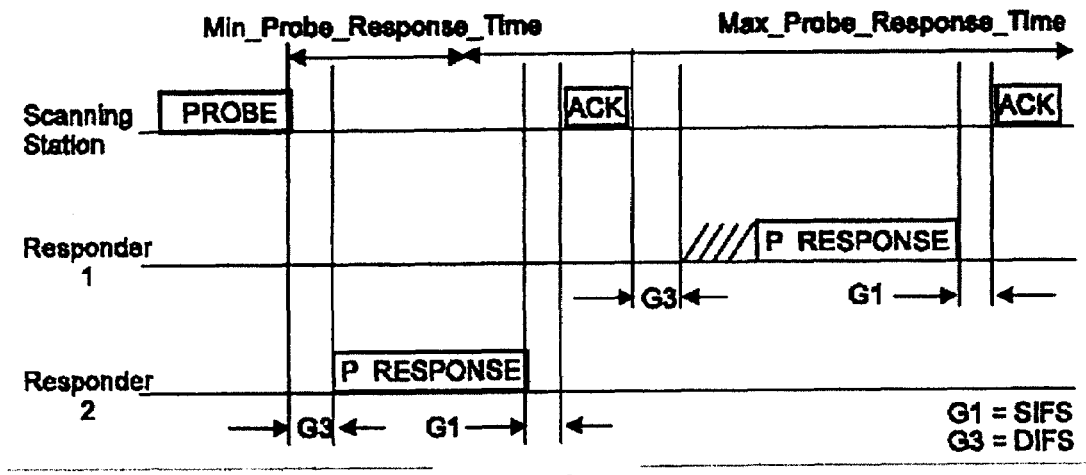
-- Prior Art --
FIG. 2
| Element ID | Length |
|---|---|
| Country String (Octets 1, 2) ||
| Country String (Octets 3) | First Channel Number |
| Number of Channels | Maximum Transmit Power Level |
| ... ||
| First Channel Number | Number of Channels |
| Maximum Transmit Power Level | Pad (if needed) |
-- Prior Art --
FIG. 3

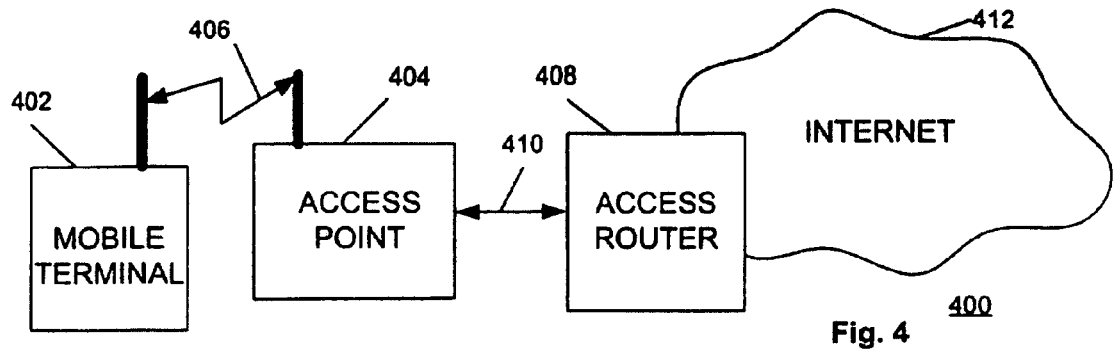
Fig. 4
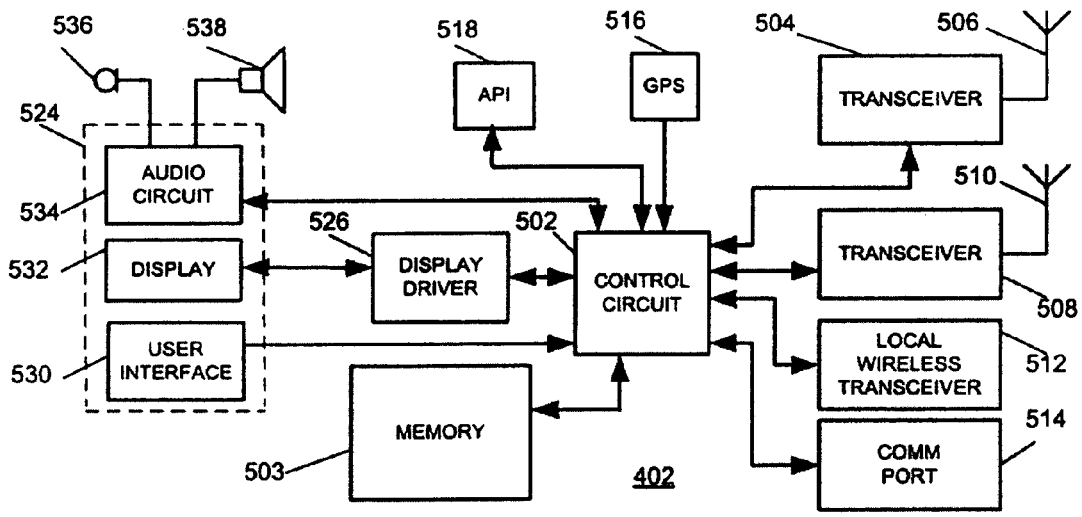
Fig. 5
| Element ID | Length |
|---|---|
| Country String (Octets 1, 2) ||
| Country String (Octets 3) | First Channel Number |
| Number of Channels | Maximum Transmit Power Level |
| ... ||
| First Channel Number | Number of Channels |
| Maximum Transmit Power Level | Pre-alert |
| Lifetime | Pad (if needed) |
Fig. 6

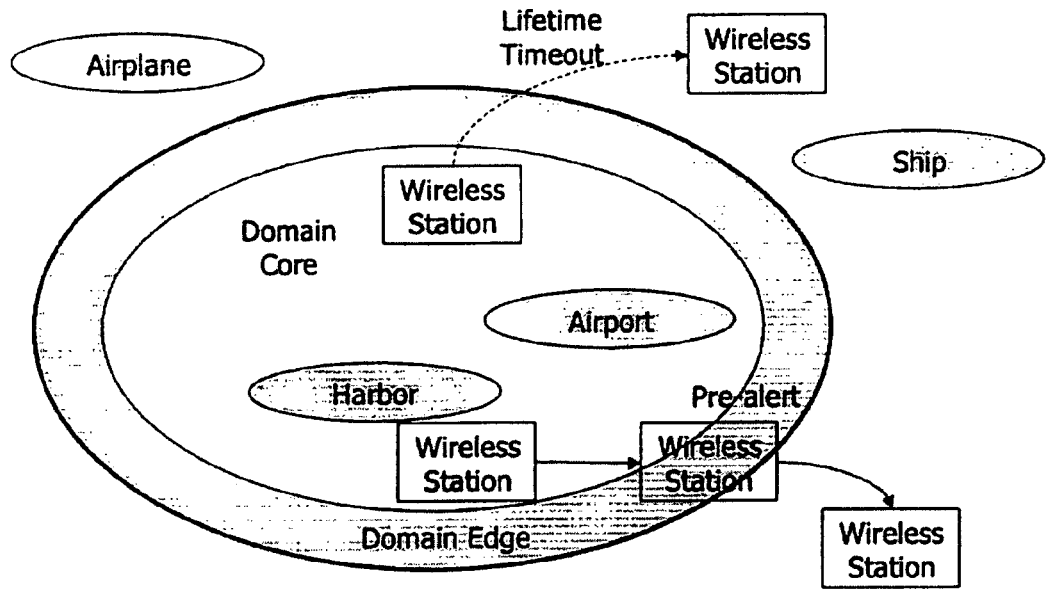

FIG. 9

| Element ID | Length |
|---|---|
| Country String (Octets 1, 2) ||
| Country String (Octets 3) | First Channel Number |
| Number of Channels | Maximum Transmit Power Level |
| ... ||
| First Channel Number | Number of Channels |
| Maximum Transmit Power Level | Pre-alert |
| Lifetime | First Channel Number |
| Number of Channels | Maximum Transmit Power Level |
| ... ||
|  | First Channel Number |
| Number of Channels | Maximum Transmit Power Level |
| Lifetime | Pad (if needed) |

FIG. 10

SYSTEM AND METHOD FOR CHANNEL SCANNING IN WIRELESS NETWORKS

CROSS-REFERENCE TO RELATED APPLICATIONS

This application claims benefit of Provisional Application Nos. 60/438,864, filed Jan. 9, 2003, and 60/492,689, filed Aug. 5, 2003. The present application incorporates the disclosure of these provisional applications by reference. The present application is also a division of U.S. patent application Ser. No. 10/733,927 filed on Dec. 10, 2003, incorporated herein by reference

BACKGROUND OF THE INVENTION

1. Field of the Invention

The present invention relates generally to wireless stations and networks, and more particularly to a method of scanning channels in a wireless network.

2. Description of the Related Art

Regulatory domains, such as individual nations, independently determine the frequency band and the maximum transmission power allowed for wireless communication systems. The conditions established by each regulatory domain may vary significantly even for the same wireless communication system. For example, while the 4.9-5.0 gigahertz (GHz) band is allowed for IEEE802.11a wireless local area network (WLAN) in Japan, the 4.94-4.99 GHz band is reserved for public safety band in the United States, and thus cannot be used for IEEE802.11a. Similarly, the 5.470-5.725 GHz band, which is planned to be used for IEEE802.11a WLAN in Europe, overlaps with a military band in the United States.

In contrast to an access point which is stationary and can be well controlled by the regulation of the corresponding domain, wireless stations may move through different domains around the world, and thus will be under different regulations depending on the domain. If an IEEE802.11a station of Japan or Europe is moved to the United States, for example, it should be able to get the correct information on the frequency band and the maximum transmission power permitted in the United States, enabling the wireless station to adapt itself to be in compliance with the regulations of the United States.

Generally, wireless stations use channel scanning to get such information as the frequency band and the maximum transmission power. Channel scanning can be classified into two categories: passive channel scanning and active channel scanning. A wireless station can passively scan channels by just receiving a beacon frame of each channel. As shown for example in FIG. 1, beacons are transmitted with an approximate period of the beacon interval. Assume that a beacon frame from an access point is received for a specific channel. Since an access point, which is more properly regulated by each domain, is using the channel, the wireless station can determine that the scanned channel is within the legal frequency band of the residing domain. Furthermore, the beacon frame may have an information field that indicates the maximum transmission power for the channel, which will be used by the wireless stations in their power control.

However, if a beacon is not received for the scanned channel within a certain time limit after a wireless station starts to listen for a beacon, then the channel is determined by the wireless station to be unavailable for one of two reasons. One reason is that the channel is outside of the legal frequency band of the residing domain. The other is that there are currently no access points using the channel even though the channel is within the legal frequency band.

By listening to all channels that are used in the WLAN, a wireless station can collect all the information on channels that are currently supported by access points and within the legal frequency band of the residing domain. Since passive channel scanning is performed using only the receiving capabilities of wireless stations, there is no risk of violating the regulation of any domain. In this aspect, passive channel scanning is suitable for safe domain-aware channel scanning. However, passive channel scanning is disadvantageous because it may take a long time, which can be as much as a beacon interval of the corresponding access point. For IEEE802.11a, the beacon interval is usually set on the order of 100 msec. As a result, passive channel scanning may not be appropriate for channel scanning as, for example, in a handover where fast channel scanning is particularly important.

In contrast, active channel scanning involves the generation of probe frames and the subsequent processing of received probe response frames for each channel. FIG. 2 shows a timing diagram of a probe frame and a probe response frame. If the network is not crowded, the probe frame and the probe response frame can be transmitted with awaiting time as small as the distributed interframe space (DIFS), which is a very small value compared to the beacon interval. Assume that a probe response frame from an access point is received for the channel on which a probe frame was sent. Since an access point, which is more properly regulated by each domain, is using the channel, the wireless station can determine that the scanned channel is within the legal frequency band of the residing domain. Furthermore, the probe response frame may have an information field that indicates the maximum transmission power allowed for the channel.

Assume, on the other hand, that a probe response frame is not received for the scanned channel within a certain time limit from the transmission of a probe frame, which is very short compared to the time limit in passive channel scanning. Then, the channel is determined by the wireless station to be unavailable. But, as in the passive scan, there can be two different reasons. One reason is that the channel is outside of the legal frequency band of the residing domain. The other is that there are currently no access points using the channel even though the channel is within the legal frequency band. By transmitting probe frames on all channels that are used in the WLAN system, a wireless station can collect all the information on channels that are currently supported by access points and within the legal frequency band of the residing domain.

The difference between an active scan and a passive scan is that an active scan actively provokes access points to transmit the probe response, while a passive scan waits passively for the beacon to be transmitted by access points. As a result, an active scan shows quite different characteristics from those of a passive scan. Since an active scan involves actual transmission of a probe frame, it may violate the regulations of the residing domain. For example, the channel to which the probe frame was transmitted may not be within the legal frequency band, or the transmission power of the probe frame may exceed the regulated maximum transmission power. In this sense, active channel scanning is inappropriate for safe domain-aware channel scanning. The main great advantage of active channel scanning, however, is that it usually takes less time than passive channel scanning does. This is mainly because, while the beacon interval is relatively large, the probe frame and probe response frame can be sent in shorter time. Active channel scanning, therefore, is desirable fast channel scanning such as in a handover situation.

However, neither passive channel scanning nor active channel scanning can be used for both safe and fast domain-aware channel scanning. Although the passive channel scanning is advantageous in terms of safely observing network regulations, such as maximum transmission power, it is slow, making smooth handover difficult. Active channel scanning, although fast, cannot be used in safe domain-aware channel scanning, since it may violate the regulations of the residing domain.

To improve the situation, IEEE 802.11d proposes transmitting the country code and the regulatory information, as shown in FIG. 3, in the beacon and probe response frames of IEEE802.11 WLAN. The element identifier indicates that this information is related to the domain information. The length of the information element is variable, as the element may contain more than one triplet, for example comprising the First Channel Number, Number of Channels, and Maximum Transmit Power Level fields. The Country String field of the element shall describe the country name and is 3 octets in length. The First Channel Number field shall indicate the lowest channel number in the sub-band described in this information element. The Number of Channels field of the sub-element shall indicate the number of channels in the sub-band. The group of channels described by each pair of the First Channel Number and the Number of Channels fields preferably shall not overlap and shall be monotonically increasing in channel numbers. The Maximum Transmit Power Level field shall indicate the maximum power, in dBm, allowed to be transmitted for the sub-band. The Pad field is for padding and shall have 0 or 1 octet in length.

According to IEEE 802.11d, when a wireless station has lost a connection with an access point, it shall passively scan to learn at least one valid channel, i.e. a channel upon which it detects IEEE 802.11 frames. Once the wireless station has acquired the information so that it is able to meet the transmit requirements of the regulatory domain, it shall transmit a probe request to an access point to gain the additional regulatory domain information contained in the probe response frame, unless the information was previously received in a beacon frame. The wireless station then has sufficient information available for operation in the regulatory domain.

While guaranteeing safety by using passive scan whenever a wireless station has lost connection with its access point and also reducing scanning time by using active scan after the regulatory information becomes available, IEEE 802.11d has a number of disadvantages. For example, scanning time for wireless stations staying within a domain is still long. In order to avoid possible regulation violations due to domain changes, IEEE 802.11d uses passive scan until valid domain information is obtained. However, the scanning time of a passive scan in the beginning is still significant for a wireless station that moves around but stays within a domain. Although the scanning time for IEEE 802.11d is better on the average than in the all-passive scan case, the worst case performance of IEEE 802.11d may be similar to the all-passive scan case.

Suppose a wireless station is connected to an access point of a WLAN system having N channels via Channel 1. After the wireless station has lost a connection with the access point, it tries to find a new channel. Assuming that Channel N is the only channel available around the station and that the channel scanning happens to be in increasing order of channel number, then the scanning time would be as much as (N−1) times as long as the beacon interval, which is the same as in the case of all-passive scan. Considering the number of wireless stations staying within a regulatory domain, which would be much larger than the stations crossing the regulatory domain boundary, the scanning speed cannot be sacrificed for the domain-aware roaming capability.

Further, IEEE 802.11d does not consider domain-independent channels. Some channels of a WLAN may be common to several neighboring domains or even for all participating domains. Therefore, there is no danger of violating regulations in transmitting a probe request frame on this kind of domain-independent channel. Accordingly, the domain independent channels can be actively scanned without waiting for domain information. IEEE 802.11d, however, does not consider domain independent channels, and passively scans domain-independent channels.

Therefore, a safe and fast domain-aware channel scan method and system are needed. The channel scanning method must preferably provide a fast scanning speed for the wireless stations staying within a regulatory domain. The channel scanning method must also enable wireless stations crossing the domain boundary to observe the regulation of the new domain.

Accordingly, there is a need for an improved wireless station and a method and system of scanning channels in a wireless communication network.

SUMMARY OF THE INVENTION

It is an object of the present invention to enable any wireless station that moves across a domain boundary to comply with the changed regulation of the new domain. The scanning speed of the wireless stations staying within a domain is also preferably maximized. According to one aspect of the present invention, a pre-alert field is provided in a data block.

Because of the mobility of a wireless station, it is very difficult for a wireless station to predict whether upcoming access points are in the same domain. On the other hand, the access points themselves are stationary and thus may have better information on the domain of nearby areas. Based on the estimation, access points may include in their frames to wireless stations, such as beacon frames and probe response frames, a Pre-alert field indicating that there would be a possibility of domain change after wireless stations have lost a connection with the access point. There would be a possibility of domain change when wireless stations attempt channel scanning.

When a wireless station has lost a connection with its access point, it determines the channel scanning method based on the Pre-alert field in the domain information of the previous access point, provided that the information is valid. If there is a possibility of domain change, a wireless station should be careful in using active scanning. It may have to use only the passive scanning throughout the channel scanning. If there is no possibility of domain change, on the other hand, a wireless station may be able to use active scanning using the domain information of the previous access point.

According to another aspect of the present invention, a lifetime field is provided in the domain information of access points. When a wireless station loses connection with its access point, it determines whether the domain information provided by this access point is still valid based on the lifetime field.

According to a further aspect of the present invention, domain-independent-channel-first (DICF) active scanning is used in the event that certain channels are known to be domain independent.

BRIEF DESCRIPTION OF THE DRAWINGS

FIG. 1 is a timing diagram showing the conventional transmission of beacons for passive scanning in a wireless communication network.

FIG. 2 is a timing diagram showing the conventional transmission of probes for active scanning in a wireless communication network.

FIG. 3 shows an example of a conventional format for providing domain information to a wireless station.

FIG. 4 shows a wireless communication network employing embodiments of the present invention.

FIG. 5 shows a wireless station employing embodiments of the present invention.

FIG. 6 shows a format for providing domain information according to an embodiment of the present invention.

FIG. 9 shows a system level diagram showing the operation of a wireless station in a wireless communication network according to one embodiment of the present invention.

FIG. 10 shows a format for providing domain information according to an alternate embodiment of the present invention.

DETAILED DESCRIPTION OF EMBODIMENTS

Figure 7:
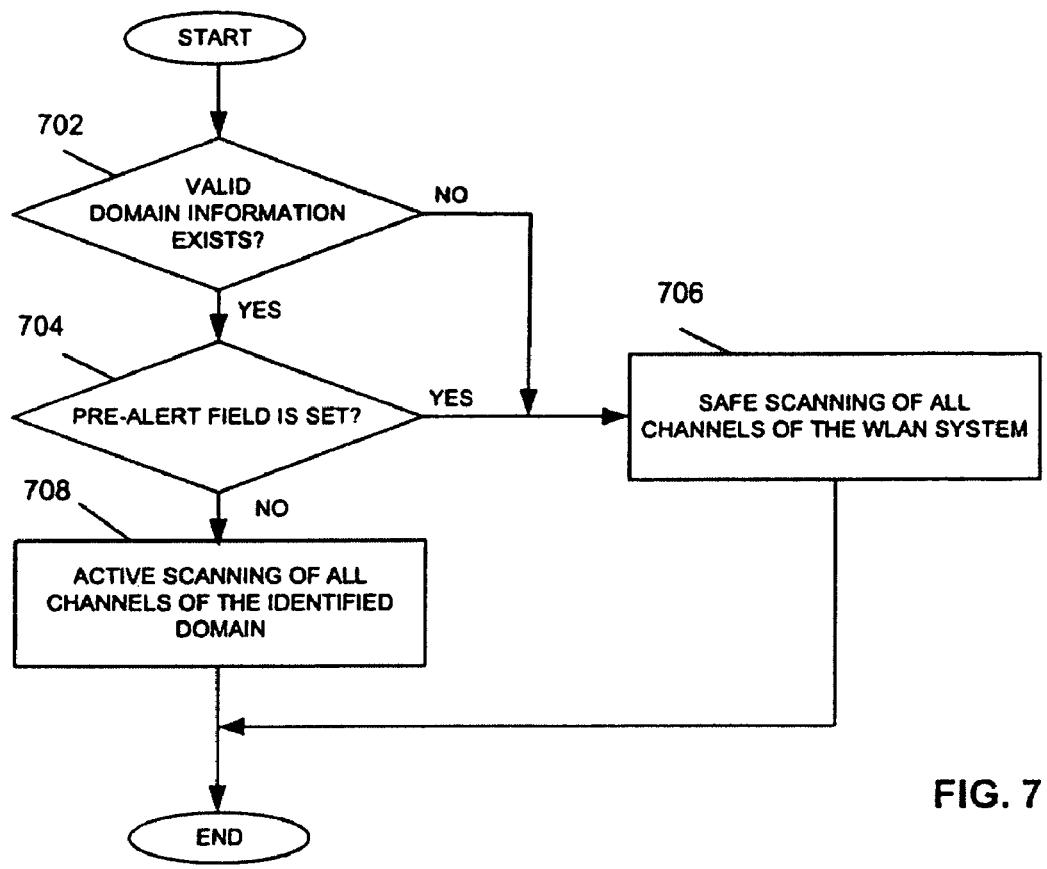
FIG. 7 shows a flow chart of a method for scanning channels according to an embodiment of the present invention.

FIG. 4 shows a block diagram of a wireless communication network employing embodiments of the present invention. A wireless station (mobile terminal) 402 is coupled to an access point 404 by a wireless communication link 406. The access point 404 is coupled to an access router 408 by a communication link 410. The access router 408 is coupled to a communication network, such as the Internet 412.

FIG. 5 shows a block diagram of the wireless station 402 according to one embodiment of the present invention. The wireless station 402 preferably includes a control circuit 502, such as a microprocessor, microcontroller, ASIC or other circuits or integrated circuits used to control the wireless station 402. A memory device 503 could also be coupled to the control circuit 502. The control circuit 502 is also coupled to a first transceiver 504 having an antenna 506, and a second transceiver 508 having an antenna 510. The wireless station 402 could also include a local wireless transceiver 512 for enabling low-power communications, such as infrared, Bluetooth, IEEE 802.11, etc. The wireless station 402 can also include a communication port 514 for enabling wired communications such as RS-232 communication. The wireless station 402 also preferably includes a GPS unit 516 enabling the reception of GPS signals. The control circuit 502 is also coupled to a user interface section 524 which preferably comprises a user interface 530, a display 532, and audio circuitry 534 having a microphone 536 and/or a speaker 538. The wireless station could be any type of wireless communication device, such as a wireless PDA or a cellular telephone.

FIG. 6 shows a format for providing domain information according to an embodiment of the present invention. The domain information format preferably comprises a Pre-alert field. The domain information format could also comprise a Lifetime field. These fields could preferably be included in the beacon frame and/or the probe response frame of access points. A Pre-alert field and/or a Lifetime field could also be included in any frame transmitted by an access point, and those frames including a Pre-alert field and/or a Lifetime field could be transmitted either autonomously by the access point or in response to implicit or explicit transmission requests by wireless stations. The Pre-alert field is preferably set if the access point sending the domain information concludes that there is a possibility of domain change, as will be described in more detail below. Similarly, the Lifetime field has a value indicating the time remaining before the domain information is expired after the connection of a wireless station with the access point has been lost.

FIG. 7 is a flow chart showing a method of scanning channels according to one embodiment of the present invention. A wireless station trying to scan channels first checks the Lifetime field of the domain information and determines whether there is valid domain information (step 702). If so, it proceeds to check the Pre-alert field to investigate the possibility of fast active scan by determining if a Pre-alert field is set (step 704). Otherwise, the station just uses a safe channel scanning method (step 706). Safe channel scanning could be, for example, passive scanning, or the scanning method described in IEEE 802.11d. Since there is no valid domain information, the safe channel scan should preferably cover all channels of the WLAN system. If the Pre-alert field is not set, the wireless station actively scans all channels of the identified domain (step 708). If the Pre-alert field is set, the wireless station just uses safe channel scanning. Since the station might have moved to a different domain but it has no valid domain information, the safe channel scan preferably should cover all channels of the WLAN system.

The Pre-alert field is preferably established under following guidelines. There must be no possibility of domain change if Pre-alert field is not set. This is necessary in order to ensure there is no regulation violation in the changed domain. Because an erroneous unsetting of the Pre-alert field results in the active scanning from the beginning of channel scan, there is a high possibility of violating the regulation of the changed domain. Erroneous setting of the Pre-alert field is allowed, but should be minimized to enable fast scanning. Unlike erroneous unsetting of Pre-alert field, erroneous setting does not endanger safe scanning (i.e. it still avoids violating a domain regulation). However, since it degrades the scanning speed of the wireless stations by prohibiting active scanning, erroneous unsetting should be minimized as much as possible.

As should be apparent, an access point should make a tradeoff between the effort for accurate Pre-alert field control and the channel scanning speed of a wireless station within its coverage area. In one extreme of the tradeoff, the Pre-alert field of all access points of a domain can be set without paying any attention to accuracy. Since this approach prohibits the use of active scanning until the capture of valid domain information, the wireless stations suffer from the slow channel scanning speed. In the other extreme of the tradeoff, the Pre-alert field is set only at the access points when, within or in the vicinity of their coverage areas, there is possibility of domain change. This maximizes the number of access points using active scanning, but much effort must be paid to accurate estimation.

Although both the Lifetime field and the Pre-alert field are provided in the domain information and used by the wireless station in the embodiments shown in FIGS. 6 and 7, it should be understood that they could be used independently. That is, one of these fields could be provided without having to include the other field. As a further alternative, there might be space permitted for both fields, but information provided in only one of the fields, rather than in both.

Figure 8:
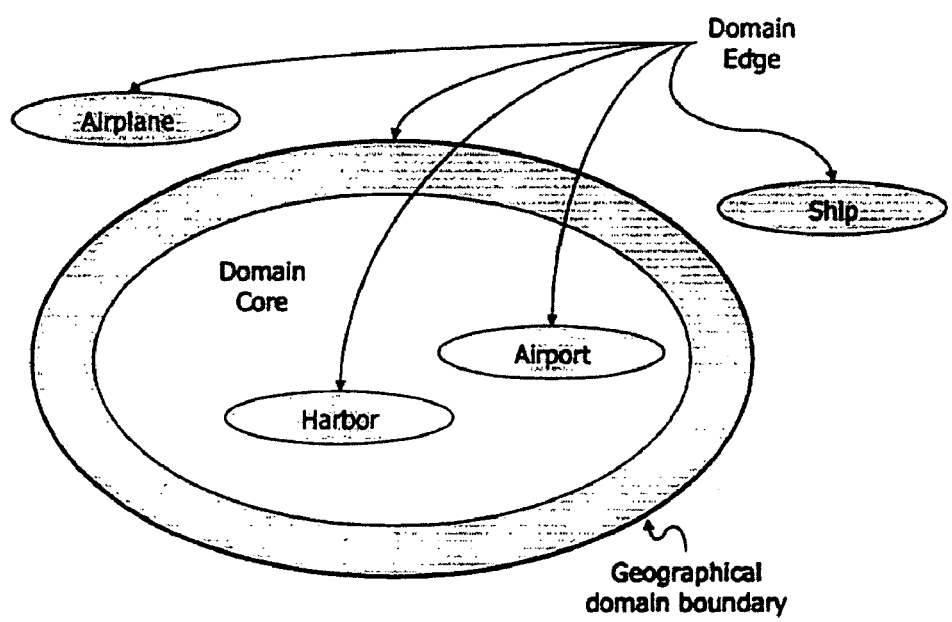
FIG. 8 shows a system level diagram of elements of a wireless communication network according to one embodiment of the present invention.

Turning now to FIG. 8, a system level diagram shows elements of a wireless communication network. One way for an access point to determine the possibility of domain change is to investigate nearby areas using test stations. Another way is to use its maximum coverage area and geographical information. If its coverage area includes or is close to the geographical boundary of the domain, it is determined that there is a possibility of domain change. An easier but more inaccurate way of determining the possibility of domain change is to use only the geographical information. If an access point is located within a county, a city, or a state having a geographical boundary, then it is determined that there is a possibility of domain change. Another way is to use the context of the location (i.e. the proximity information related to the distance to a predetermined point). If an access point is located in an airport, a harbor, a ship, or an airplane, then there is a great possibility of domain change after the connection has been lost.

In particular, the area where the Pre-alert field is to be set by the access points is the domain edge, and the other area is the domain core. It should be noted that the wireless stations in the domain edge do not have to be sensitive to the Lifetime field. Since the Pre-alert field is set in the domain edge, the domain information is not used in channel scanning regardless of the value of the Lifetime field.

Turning now to FIG. 9, a system level diagram shows the operation of a wireless station in a wireless communication network according to one embodiment of the present invention. In this embodiment, control of the Lifetime field for the wireless stations in the domain core is very important for the correct operation of the network. Suppose a wireless station moves from the domain core to the outside of the domain, as shown in the upper part of FIG. 9. While the station is crossing the domain boundary, it may not receive any domain information from the access points in the domain edge. There might have been no reachable access points around the moving path, or the wireless station itself might have been powered off. Since the station has the domain information of the domain core, it uses active scanning in the changed domain unless the Lifetime of the information has expired.

To prevent such a scenario, the Lifetime field must be controlled according to the following guidelines. It must provide safe scanning by ensuring that there is no possibility of domain change if the Lifetime field is not expired. That is, the Lifetime value must be smaller than the time for a wireless station to traverse the domain edge and arrive at the domain boundary. The shortest distance from the domain boundary to the edge of the coverage area of an access point is denoted by "L". The maximum speed of the wireless stations is denoted by "S". Accordingly, the Lifetime should be set to be equal to or smaller than L/S. However, it is allowable for the Lifetime value to be smaller than needed, but it should be as large as possible to maximize the use of the domain information, and therefore enable fast scanning. Based on the above safe scanning criteria, the Lifetime should be set to be L/S.

Accordingly, for access points, it is necessary to consider a tradeoff between achieving accurate Lifetime field control and the channel scanning speed of wireless stations within its coverage area. In one extreme of the tradeoff, the Lifetime field of an access point can be set to be 0 without any concern for accuracy. Since this prohibits the use of domain information whenever connectivity has been lost, the wireless stations coming out of the domain suffer from slow channel scanning speed. In the other extreme of the tradeoff, the Lifetime field is set to be L/S. This maximizes the number of wireless stations using active channel scanning, but requires significant effort to get such information as L and S. As a practical solution, fast scanning is more important in the handover than in the start-up. Therefore, if the maximum handover time for a WLAN system is known to be less than L/S, one can avoid effort to get the information on L and S by using the maximum handover time for the Lifetime.

Even when the Pre-alert field is set, the use of active scanning can be increased by introducing domain-independent-channel-first (DICF) active scanning. DICF takes advantage of the domain-independent channels between neighboring domains or for all participating domains. For example, the 5.15-5.25 GHz band capable of 4 channels is allowed for IEEE802.11a in Japan, Europe, and the United States. There is some possibility that this band will be universally available for all participating domains. Furthermore, if neighboring domains are considered, more domain-independent channels might be able to be found. Such identification of domain-independent channels is significant because they can be actively scanned without any danger of regulation violations. The information on domain-independent channels can be preferably included in the beacon frame and the probe response frame and can be sent to the wireless stations. The information on domain independent channels can also be included in any frame transmitted by an access point, and those frames including the information can be transmitted either autonomously by the access point or in response to implicit or explicit transmission requests by wireless stations. As shown in FIG. 10, the information on domain-independent channels can be inserted between the Lifetime field and the Padding field of FIG. 6.

Appropriate values are written into the First Channel Number, Number of Channels, and Maximum Transmit Power Level fields for the domain-independent channels. The Lifetime field after these fields is for the domain-independent channels. It should be noted that the Lifetime of the domain-independent information is not necessarily the same as the Lifetime of the domain information. For example, if there are domain-independent channels for all domains, they can be sent in the beacon frame and the probe response frame with infinite or very long Lifetime value, while the Lifetime of the domain information itself is set to be relatively short.

Figure 11:
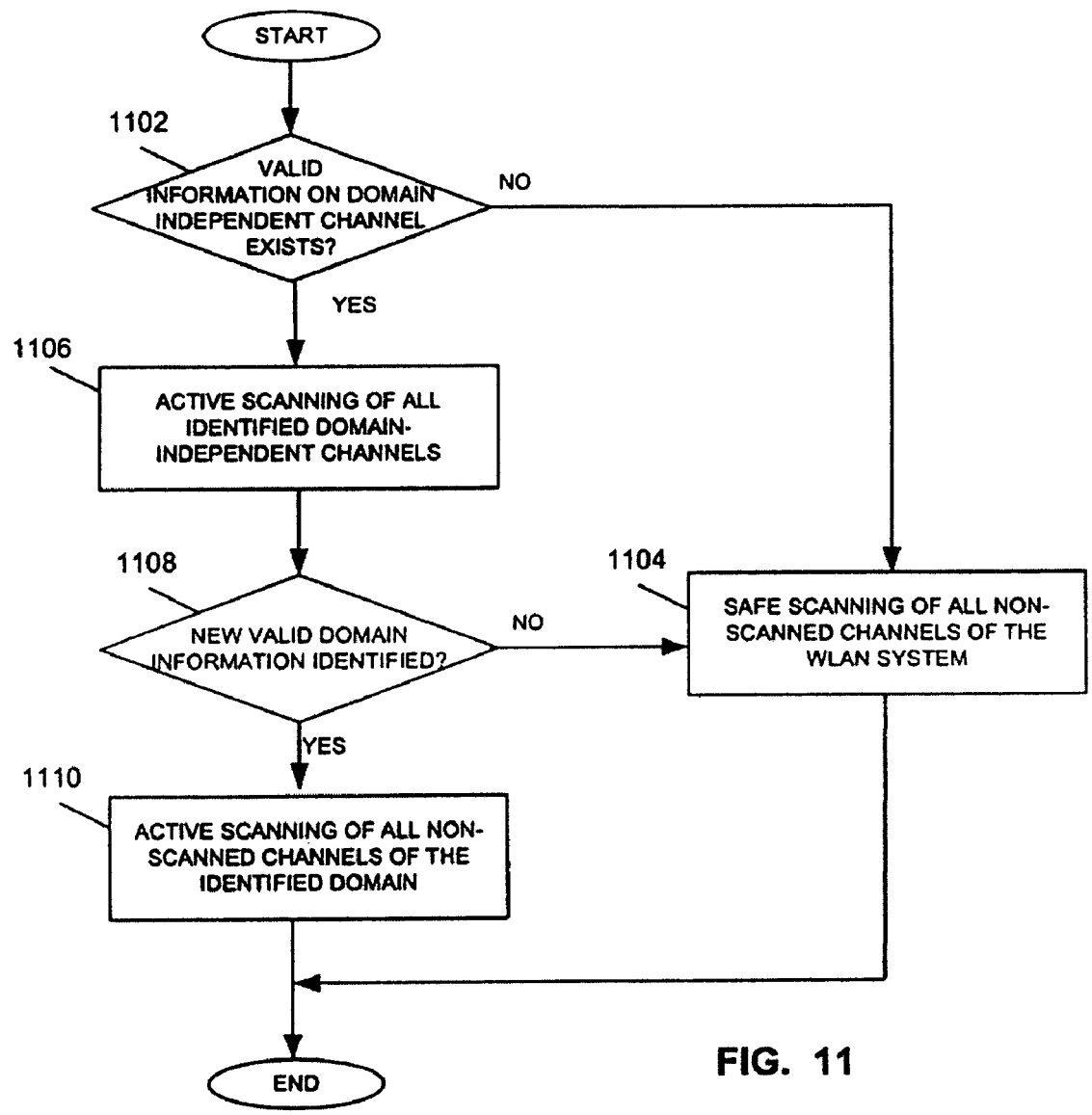
FIG. 11 shows a flow chart of a method for scanning domain independent channels according to one embodiment of the present invention.

FIG. 11 shows a flow chart of a method of scanning domain-independent channels according to one embodiment of the present invention. In particular, a wireless station trying to scan channels first checks whether there is valid information on domain-independent channels (step 1102). If there is no such information, the station just uses a safe channel scanning method (step 1104). Since there is no valid domain information, the safe channel scan should cover all non-scanned channels of the WLAN system. If there is valid information on domain-independent channels, a wireless station can actively scan the domain-independent channels (step 1106). After all domain-independent channels have been scanned, the wireless station checks whether any valid domain information was identified during the scanning process (step 1108). If so, it actively scans all non-scanned channels of the identified domain (step 1110). Otherwise, it just uses a safe channel scanning. Since there is no valid domain information, the safe channel scan should cover all non-scanned channels of the WLAN system.

Accordingly, a safe and fast channel scanning method for infrastructure WLAN is described. A Pre-alert field is preferably used to inform the wireless stations about the possibility of a domain change. The channel scanning speed in the domain core are significantly improved because the passive scanning can be avoided by unsetting the Pre-alert field. The use of stale domain information, which is a common cause of the regulation violation, is prohibited either by the expiration of Lifetime field or by the setting of Pre-alert field. In addition, by actively scanning the domain-independent channels, scanning speed is further improved without violating regulations.

In the embodiments described above, the access points determine the possibility of domain change and inform the wireless stations accordingly. Skilled artisans would appreciate that, in the pre-alert field, the access points can alternatively provide information related to a domain change, e.g. the coverage area information, the geographical information, or the proximity information, and let the wireless stations to decide the possibility of domain change.

It will be appreciated by those skilled in the art that there are numerous alternatives and equivalents to the disclosed invention. As a result, the invention is not to be limited by the foregoing embodiments, but only by the following claims.

What is claimed is:

1. A telecommunication system comprising:
   a network;
   a wireless station comprising:
      a receiver for receiving a data block, wherein said data block comprises a domain change pre-alert field;
      a controller coupled to said receiver, said controller selecting a channel scanning method based upon data in said domain change pre-alert field, said data in said domain change pre-alert field being based on geographic information of the access point; and
      a transmitter coupled to said controller; and
   an access point providing said data block to said wireless station.

2. The telecommunication system of claim 1, wherein the transmitter transmits a probe frame if said domain change pre-alert field is not set.

3. The telecommunication system of claim 1, wherein said data in said domain change pre-alert field is based on information related to proximity of the access point to a predetermined point.

4. The telecommunication system of claim 1, wherein said data in said domain change pre-alert field is based on a maximum coverage area and geographical information of the access point.

5. A telecommunication system comprising:
   a network; and
   a wireless station comprising:
      a receiver for receiving a data block, wherein said data block comprises a lifetime field based upon a maximum handover time;
      a controller coupled to said receiver, said controller selecting a channel scanning method based upon data in said lifetime field, said channel scanning method being selected from among active and passive scanning methods; and
      a transmitter coupled to said controller; and an access point providing said data block to said wireless station.

6. The telecommunication system of claim 5, wherein said lifetime field is based upon the shortest distance from a domain boundary to an edge of a coverage area of the access point.

7. The telecommunication system of claim 5, wherein said lifetime field is based upon a maximum speed of said wireless station.

8. The telecommunication system of claim 5, further comprising performing a safe channel scan if an elapsed period of time after the communication between said wireless station and said access point has been lost is greater than a period of time in said lifetime field.

* * * * *

UNITED STATES PATENT AND TRADEMARK OFFICE
CERTIFICATE OF CORRECTION

PATENT NO. : 7,602,757 B2  Page 1 of 1
APPLICATION NO. : 11/220837
DATED : October 13, 2009
INVENTOR(S) : Jeong et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 958 days.

Signed and Sealed this

Fifth Day of October, 2010

David J. Kappos
*Director of the United States Patent and Trademark Office*